United States Patent Office 2,697,709
Patented Dec. 21, 1954

2,697,709

MERCAPTO HETEROCYCLES AND METHOD OF MAKING

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application June 11, 1952,
Serial No. 292,974

Claims priority, application Great Britain June 14, 1951

7 Claims. (Cl. 260—252)

The present invention relates to 6-mercaptopurines and to processes for preparing the same. Its main object is to provide new compositions of matter which are useful as inhibitors of microorganisms and in providing temporary remission in the treatment of acute leukemia and chronic myelogenous leukemia. A further object is to provide methods of introduction of a mercapto group into the 6-position of the purine system. Additional objects will become apparent from the description and appended claims.

The new group of substances may be formulated as follows:

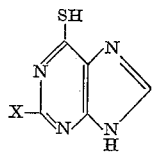

where X is selected from the class consisting of hydrogen and chloro, hydroxyl, mercapto, amino, alkyl, alkylamino and alkylmercapto radicals.

The compositions are prepared from intermediates of the type:

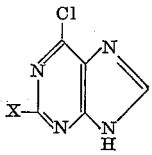

wherein X has the values aforementioned, by reaction with reagents of the class consisting of sodium hydrosulfide and thiourea. They may also be prepared from intermediates of the type:

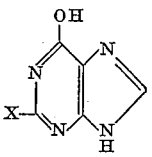

by reaction with phosphorus pentasulfide, as described in our copending application, Serial No. 292,975, filed June 11, 1952, now Patent No. 2,691,654. In a further variation, a 4-amino-5-formamido-6-hydroxypyrimidine may be reacted with phosphorus pentasulfide whereupon sulfurization and cyclization occur in one operation.

The examples described below illustrate the methods which may be used to obtain the desired compositions. It will be obvious that many variations are possible, especially in the order in which several of the necessary steps may be performed. The examples, therefore, are illustrative only and not restrictive, the scope of the invention being defined in the claims.

The 6-mercaptopurines may be converted to purinyl-6-disulfides by oxidation. In many biological systems an equilibrium between mercapto compounds and disulfides is known to be established as a general property of sulfur compounds of this type. The two forms therefore are pharmacological equivalents.

The compounds may be written in a variety of equivalent tautomeric formulas some of which are illustrated below:

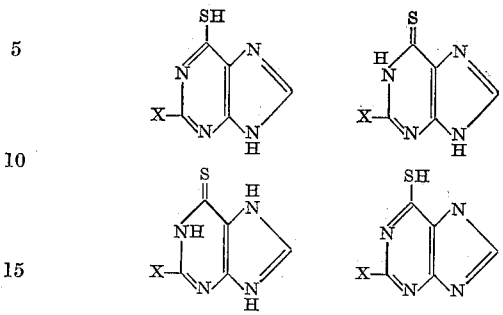

The mercaptopurines, in general, melt only with decomposition and at high temperatures. The melting points, therefore, are not suitable for characterization. More characteristic are the ultra-violet absorption spectra which exhibit absorption maxima in the region 310–350 m$\mu$ (other maxima at shorter wave lengths may also be present).

The 6-mercaptopurines form salts with both bases and acids. The non-toxic salts are the pharmacological equivalents of the free purines.

EXAMPLE 1

6-mercaptopurine

A mixture of 9.5 g. of 4-amino-5-formamido-6-hydroxypyrimidine, 55 g. of finely ground phosphorus pentasulfide and 300 ml. of tetralin was heated at 190° with mechanical stirring for two hours. After cooling, the insoluble residue was filtered off and washed with petroleum ether. The solid was then suspended in 350 ml. of water and 2 N sodium hydroxide added gradually with stirring until all the phosphorus pentasulfide had been decomposed and the pH remained at 8. The mixture was then filtered and acidified to pH 5 with acetic acid. A dark yellow precipitate formed slowly and was collected after several hours at room temperature. This precipitate (3.0 g.) by its ultraviolet absorption spectrum was 6-mercaptopurine. Concentration of the mother liquors to 150 ml. and standing for several days produced another precipitate (2.6 g.) which was a mixture of 6-mercaptopurine and the starting pyrimidine.

EXAMPLE 2

6-mercaptopurine

Two grams of 4-amino-5-formamido-6-hydroxypyrimidine and 10 g. of finely ground phosphorus pentasulfide were refluxed in 80 ml. of pyridine for three hours. The excess pyridine was then removed under reduced pressure and the gummy residue boiled with 100 ml. of water for five minutes. The pH was adjusted to 4 by the addition of hydrochloric acid and the solution was cooled. A small amount of dark brown precipitate formed in several hours. This was discarded, since it did not have the characteristic ultraviolet absorption spectrum of 6-mercaptopurine. The precipitation of the 6-mercaptopurine was slow, requiring two weeks before 0.7 g. of this product was collected.

EXAMPLE 3

6-mercaptopurine

A mixture of 18.5 g. hypoxanthine and 80 g. of phosphorus pentasulfide in 500 ml. of tetralin was heated at 200° for eight hours. The mixture was cooled and filtered. The solid residue, after being washed with petroleum ether and dried at room temperature, was boiled with 2 liters of water. The hot solution was filtered and the pH adjusted to 5 with ammonium hydroxide. Dark yellow crystals of 6-mercaptopurine hydrate precipitated on standing (12 g.). Concentration of the mother liquors led to the recovery of 5 g. of unreacted hypoxanthine.

EXAMPLE 4

6-mercaptopurine

A mixture of 5 g. of hypoxanthine, 5 g. of "liver of sulfur" and 20 g. of phosphorus pentasulfide in 150 ml. of tetralin was heated at 200° for 12 hours. The mixture was cooled and the insoluble residue collected and washed with benzene. The residue was boiled with 600 ml. of water and filtered hot. On cooling, 6-mercaptopurine precipitated as yellow crystals.

EXAMPLE 5

6-mercaptopurine

A mixture of 4.5 g. of hypoxanthine and 26 g. of phosphorus pentasulfide in 100 ml. of pyridine was refluxed for 8 hours. The excess pyridine was then removed in vacuo, and the residue boiled with 150 ml. of water. This solution was acidified with hydrochloric acid and 6-mercaptopurine precipitated slowly on standing.

EXAMPLE 6

Purinyl-6-disulfide

A solution of 8.65 g. of 6-mercaptopurine hydrate and 14 g. of potassium carbonate in 250 ml. of hot water was cooled to 20°. To this was added slowly with shaking 50 ml. of 1 N aqueous iodine-potassium iodide solution. The end-point of the reaction was determined by the use of starch solution as an indicator for the excess iodine. After chilling for ten minutes the precipitate of purinyl-disulfide was filtered off, washed with water, methanol and ether and dried at room temperature.

EXAMPLE 7

2-amino-6-mercaptopurine

A mixture of 2.7 g. of finely divided guanine, 10 g. of pulverized phosphorus pentasulfide, 10 ml. of pyridine and 100 ml. of tetralin was heated at 200° with mechanical stirring for 5 hours. After cooling, the mixture was filtered and the insoluble residue treated with 150 ml. of water and 50 ml. of concentrated ammonium hydroxide. The ammoniacal solution was filtered, heated to boiling and acidified with acetic acid. Upon cooling, 2-amino-6-mercaptopurine precipitated as a dark yellow powder.

EXAMPLE 8

2-amino-6-mercaptopurine

One gram of crude 2-amino-6-chloropurine was heated with 20 ml. of 1 N aqueous potassium hydrosulfide at 120° for 5 hours. The reaction mixture was filtered to remove some insoluble material and the filtrate acidified with acetic acid. On standing, a yellow precipitate of 2-amino-6-mercaptopurine formed slowly.

EXAMPLE 9

2-amino-6-mercaptopurine

A mixture of 4.8 g. of amorphous guanine, 8 g. of "liver of sulfur" and 12 g. of finely pulverized phosphorus pentasulfide was heated with 100 ml. of tetralin at 200° with mechanical stirring for 7 hours. After cooling, the insoluble residue was filtered off, washed with benzene and petroleum ether and dried at room temperature. This residue was then boiled with 300 ml. of water, 50 ml. of ammonium hydroxide was added and the ammoniacal solution filtered. On acidification of the ammoniacal solution with acetic acid, a yellow precipitate of 2-amino-6-mercaptopurine was obtained.

EXAMPLE 10

2-methyl-6-mercaptopurine

A mixture of 5.4 g. of 2-methyl-6-hydroxypurine was refluxed with 100 ml. of phosphorus oxychloride for one hour. The excess phosphorus oxychloride was removed under reduced pressure and the residual syrup poured on 250 g. of ice. A brown precipitate formed and was filtered off. The aqueous solution, containing ca. 3 g. of 2-methyl-6-chloropurine, was neutralized with sodium hydroxide and 50 ml. of 17 N sodium hydroxide then added slowly, with chilling. The alkaline solution was saturated with hydrogen sulfide at 0° and then heated at 120° in a sealed vessel for 6 hours. After cooling, the reaction mixture was concentrated under reduced pressure and acidified with hydrochloric acid. The 2-methyl-6-mercaptopurine was collected and purified by solution in aqueous alkali and precipitation with hydrochloric acid.

EXAMPLE 11

2-methylmercapto-6-mercaptopurine

Sixteen grams of 2-methylmercapto-6-hydroxypurine and 8 ml. of dimethylaniline were refluxed in 280 ml. of phosphoryl chloride for two hours. The excess phosphoryl chloride was removed in vacuo and the remaining syrup poured on 300 g. of crushed ice. The crude 2-methylmercapto-6-chloropurine which precipitated was collected, washed with water and dried at 120°.

Five grams of 2-methylmercapto-6-chloropurine was heated with 55 ml. of 2 N sodium hydrosulfide at 140° for six hours in a sealed tube. The reaction mixture was acidified with acetic acid and 2-methylmercapto-6-mercaptopurine precipitated. The compound was purified by solution in dilute sodium hydroxide and reprecipitation with acid.

EXAMPLE 12

2-methylamino-6-mercaptopurine

Five grams of 2-methylmercapto-6-hydroxypurine and 20 ml. of 14% methanolic methylamine were heated in a sealed vessel at 140° for 19 hours. The reaction mixture was taken to dryness in vacuo and the residue dissolved in 10 ml. of concentrated hydrochloric acid and 50 ml. of water. The solution was filtered and neutralized with ammonium hydroxide, whereupon 2-methylamino-6-hydroxypurine (2.7 g.) precipitated.

A mixture of 2.7 g. of 2-methylamino-6-hydroxypurine, 4 g. of pulverized "liver of sulfur" and 15 g. of phosphorus pentasulfide was heated at 200° for 10 hours with mechanical stirring. After cooling, the insoluble material was filtered off, washed with benzene and dried. It was then treated with 250 ml. of water and 15 ml. of concentrated ammonium hydroxide and heated to boiling. The ammoniacal solution was filtered and acidified with glacial acetic acid. After cooling, the precipitate of 2-methylamino-6-mercaptopurine was collected, washed with water and dried at 100°. Its ultraviolet absorption spectrum closely resembles that of 2-amino-6-mercaptopurine.

EXAMPLE 13

2-chloro-6-mercaptopurine

A mixture of 3.8 g. of 2,6-dichloropurine, 1.52 g. of thiourea and 1.64 g. of anhydrous sodium acetate in 100 ml. of absolute ethanol was heated under reflux for 2½ hours. After cooling, the precipitate was filtered off and the alcoholic filtrate taken to dryness on the steam bath. The residue was dissolved in 90 ml. of dilute aqueous sodium hydroxide and acidified with acetic acid. The precipitate of 2-chloro-6-mercaptopurine was collected, washed with water and dried at 110°.

EXAMPLE 14

2,6-dimercaptopurine

A mixture of 3 g. of 2,6-dichloropurine and 3 g. of thiourea in 100 ml. of absolute alcohol was refluxed for nine hours. The yellow precipitate of 2,6-dimercaptopurine was collected and purified by solution in dilute aqueous sodium hydroxide and precipitation with hydrochloric acid.

EXAMPLE 15

2-hydroxy-6-mercaptopurine

A mixture of 1.4 g. of 2-chloro-6-mercaptopurine and 200 ml. of 2 N hydrochloric acid was boiled, under reflux conditions for one hour. A bright yellow precipitate of 2-hydroxy-6-mercaptopurine formed slowly and was collected after cooling.

EXAMPLE 16

*2-amino-6-mercaptopurine*

A solution of 3 g. of 2-chloro-6-mercaptopurine in 50 ml. of concentrated ammonium hydroxide, to which had been added 1 ml. of concentrated hydrochloric acid, was heated at 120° for 12 hours in a sealed tube. The ammoniacal solution was then heated on an open steam bath to remove the excess ammonia. A precipitate (2-chloro-6-aminopurine) formed at this point and was removed by filtration. The filtrate was acidified with acetic acid and chilled. A pale yellow precipitate of 2-amino-6-mercaptopurine formed slowly.

EXAMPLE 17

*2,6-dimercaptopurine*

A mixture of 20 g. of 2-mercapto-6-hydroxypurine and 100 g. of pulverized phosphorus pentasulfide in 400 ml. of tetralin was heated at 200° with stirring for 20 hours. The mixture was cooled and the insoluble residue filtered off and washed with petroleum ether. This residue was extracted three times with 2 liter portions of boiling water to remove most of the unreacted 2-mercapto-6-hydroxypurine. The insoluble residue still remaining was dissolved in 250 ml. of dilute sodium hydroxide filtered and the solution acidified with acetic acid. A yellow precipitate of 2,6-dimercaptopurine was collected, washed with water and dried at 110°.

EXAMPLE 18

*2-methyl-6-mercaptopurine*

A mixture of 1.5 g. 2-methyl-6-hydroxypurine, 2 g. of "liver of sulfur" and 8 g. of phosphorus pentasulfide in 80 ml. of tetralin was refluxed, with mechanical stirring, for 6 hours. After cooling, the residue was filtered off, washed with petroleum ether and dried. It was then boiled with 200 ml. of water, filtered hot and the filtrate taken down to a volume of 20 ml. under reduced pressure. After chilling, the yellow precipitate of 2-methyl-6-mercaptopurine was collected.

Absorption maxima of 6-mercaptopurines at pH 1.

| Example No. | 2 Substituent | max. (m$\mu$) |
|---|---|---|
| 1–5 | H | 325 |
| 10, 18 | CH$_3$ | 328 |
| 7–9, 16 | NH$_2$ | 258, 345 |
| 11 | CH$_3$—S | 240, 265, 338 |
| 12 | CH$_3$NH | 258, 348 |
| 13 | Cl | 285, 315 |
| 14, 17 | SH | 255, 300, 348 |
| 15 | OH | 255, 298, 348 |

We claim:

1. The method of preparing a 6-mercaptopurine, wherein a 6-chloropurine unsubstituted in the imidazole nucleus is reacted with a reagent of the class consisting of thiourea and the alkali hydrosulfides.

2. The method of preparing a 6-mercaptopurine wherein a 6-hydroxypurine is reacted with phosphorus pentasulfide in an inert solvent.

3. The method of preparing a 6-mercaptopurine wherein a 4-amino-5-formamido-6-hydroxypyrimidine is reacted with phosphorus pentasulfide in an inert solvent.

4. The method of preparing a 6-mercaptopurine wherein a purine substituted in the 6-position with a group selected from the class consisting of chloro and hydroxy groups and unsubstituted in the imidazole nucleus is reacted with a reagent selected from the class consisting of thiourea and the alkali hydrosulfides.

5. A compound selected from the class consisting of 6-mercapto purine and 6-purinyl disulfide.

6. 6-mercaptopurine.

7. 6-purinyl disulfide.

References Cited in the file of this patent

Beilstein, Vierte Auflage, vol. 26, p. 477.
Fischer, Untersuchengen in der Puringruppe 1907 ed., pp. 405, 406.